Patented Feb. 21, 1933

1,898,445

UNITED STATES PATENT OFFICE

RICHARD HERZ, OF FRANKFORT-ON-THE-MAIN, AND MAX SCHUBERT, OF FRANKFORT-ON-THE-MAIN-FECHENHEIM, GERMANY, ASSIGNORS TO GENERAL ANILINE WORKS, INC., OF NEW YORK, N. Y., A CORPORATION OF DELAWARE

INDOPHENOLS OF THE BENZOCARBAZOLE SERIES AND PROCESS OF MAKING SAME

No Drawing. Application filed February 1, 1932, Serial No. 590,309, and in Germany March 23, 1931.

Our present invention relates to indophenols of the benzocarbazole series and to a process of making same.

Whereas carbazole and its nitrogenous alkyl derivatives yield when condensed with nitrosophenol in a smooth reaction the corresponding indophenols, indophenols of the benzo-carbazole series cannot be obtained in this manner as in this case the reaction does not take place uniformly and oxidation products are mainly formed. Therefore indophenols of the benzo-carbazole series were unknown hitherto.

According to the present invention these indophenols are produced in a simple manner and with a good yield by condensing benzocarbazoles with a quinone-chlorimide or a nuclear substitution product thereof. Suitable for this process are the isomeric benzocarbazoles, their nitrogenous alkyl derivatives and those nuclear substitution products of the said compounds containing a free para-position relative to the carbazolic imino group.

The indophenols thus obtained correspond to the probable general formula

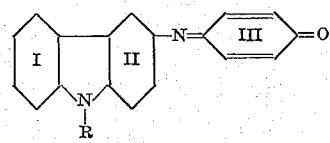

wherein two adjacent hydrogen atoms of the nuclei I or II or I and II are replaced by the benzo nucleus

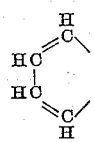

R means hydrogen or alkyl and all nuclei may contain as substituents methyl, methoxy, chlorine, hydroxy or a sulfonic acid group.

These indophenols yield by reduction the corresponding leuco-indophenols.

Both groups of compounds are valuable intermediates for the production of dyestuffs.

In order to further illustrate our invention the following examples are given the parts being by weight and all temperatures in centigrade degrees, but we wish it however to be understood that our invention is not limited to the particular products nor reacting conditions mentioned therein:

Example 1

11 parts of 1.2-benzocarbazole (α-naphthocarbazole) of 225° melting point are dissolved in about 300 parts of sulfuric acid of 66° Bé. at 0°. The solution is advantageously cooled down to a low temperature and a solution of the same temperature of 7 parts of quinone-chlorimide in about 150 parts of sulfuric acid of 66° Bé. is added by stirring. The condensation is finished by shortly stirring whereat the temperature may rise to 0°. Then the dark-blue solution is poured on ice. the separated indophenol is filtered, washed and advantageously neutralized. After drying in vacuo the indophenol is obtained in the pure form as a deep-blue colored powder. It corresponds probably to the formula:

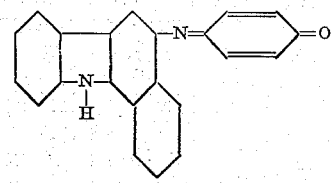

and dissolves in sulfuric acid with a blue, in acetone and ether with a bluish violet, in ethanol with a reddish violet color.

When reduced according to known methods for instance with sodium hydrosulfite the corresponding leuco-indophenol is obtained as colorless flakes. It crystallizes from methanol as colorless silvery glittering leaflets or from benzene as colorless needles of 238–240° melting point.

Example 2

By replacing in Example 1 the 1.2-benzocarbazole by 12 parts of its N-ethyl-derivative the corresponding N-ethyl-benzo-carbazole-imino-quinine is obtained. After drying in vacuo it forms a blue powder which dissolves in sulfuric acid, acetone and ether with a blue color.

The corresponding leuco-indophenol crystallizes from carbon disulfide in the form of yellowish needles of 208–210° melting point.

Example 3

By replacing in Example 1 the 1.2-benzocarbazole by 12 parts of 6-methoxy-1.2-benzocarbazole the corresponding indophenol is obtained which forms after drying in vacuo a blue powder corresponding probably to the following formula:

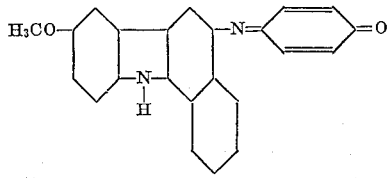

It dissolves in sulfuric acid, acetone and ether with a blue color.

The corresponding leuco-indophenol crystallizes from benzene in the form of colorless needles of 209–210° melting point.

Example 4

19.2 parts of the sodium salt of the 3.4-benzocarbazole-sulfonic acid of the formula

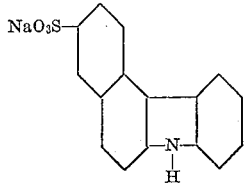

are dissolved in about 600 parts of sulfuric acid of 66° Bé. at a temperature of −5°. To this solution, which is advantageously cooled down to low temperature, a solution having the same temperature of 9.6 parts of quinone-chlorimide in about 180 parts of sulfuric acid of 66° Bé. is added by stirring and the condensation is finished by shortly stirring. Then the deep-blue solution is poured on ice. On account of the solubility of the formed indophenol-sulfonic acid and of their salts the reaction product may be isolated advantageously in the form of the leuco-indophenol by reducing in the usual manner the diluted sulfuric acid solution of the indophenol with sodium hydrosulfite, filtering the separated leuco-compound, which is purified by washing with methanol and drying.

The leuco-indophenol-sulfonic acid thus obtained represents a colorless powder not melting until 300°, being easily soluble in aqueous alkalies, difficultly soluble in water and ethanol, corresponding probably to the following formula:

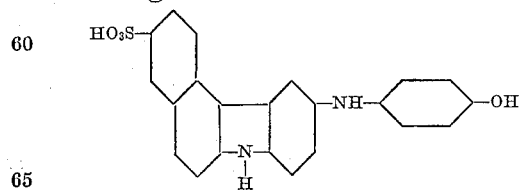

Example 5

14 parts of 1.2-5.6-dibenzocarbazole of 231° melting point are dissolved in about 300 parts of sulfuric acid of 66° Bé. at −5° to 0°. To the solution which is advantageously cooled down to a low temperature a solution of the same temperature of 10 parts of quinone-chlorimide in about 200 parts of sulfuric acid of 66° Bé. is quickly added while stirring. The reaction is finished by further stirring. Then the deep-blue solution is poured on ice, the separated indophenol is filtered, washed and the precipitated paste is advantageously neutralized. After drying in vacuo the indophenol is obtained as a deep-blue colored powder. It corresponds probably to the following formula:

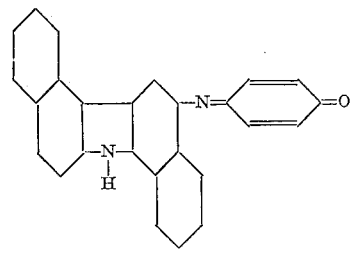

It dissolves in sulfuric acid, acetone, ether and ethanol with a reddish blue color.

When reduced according to known methods, for instance with sodium hydrosulfite, the corresponding leuco-indophenol is obtained in the form of colorless flakes. It crystallizes from benzene as colorless needles melting at 288–290°.

Example 6

The solution of 12.5 parts of 4′-hydroxy-8-methyl-1.2-benzocarbazole in about 250 parts of caustic soda solution of 4% is cooled down to about 0° by the addition of ice. This solution is mixed by stirring with a cold solution of 8 parts of quinone-chlorimide in about 200 parts of methanol and the formation of the indophenol is finished by shortly stirring. In order to separate the indophenol the mixture is acidified and filtered and the precipitate is washed and dried in vacuo. It forms a red powder being soluble in ether and chloroform with a red color.

The corresponding leuco-indophenol is obtained when into the alkaline solution of the indophenol an aqueous hydrosulfite solution is allowed to run in until decolorization and the reaction product is isolated by introducing it into aqueous sodium bisulfite, filtering and drying in vacuo. It crystallizes from benzene in the form of colorless needles melting at 223–225°.

Example 7

Into a solution of 11 parts of β-naphthocarbazole in 600 parts of sulfuric acid of 66° Bé. at a low temperature (about −20°) the solution of 11 parts of dichlorquinone-chlorimide in 300 parts of sulfuric acid of 66° Bé. is allowed to run in, the mixture is stirred for about a quarter of an hour at a low temperature and then poured on ice, filtered, washed with water and a soda-solution and dried in vacuo. The indophenol obtained in this manner represents a deep-blue powder being soluble in acetone, ether, chloroform, with a red-violet and in cold concentrated sulfuric acid with a green-blue color.

It corresponds probably to the following formula:

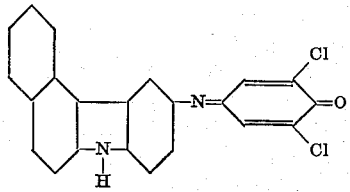

We claim:

1. A process which comprises condensing a benzocarbazole of the general formula

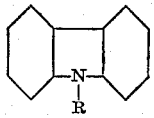

(wherein two adjacent hydrogen atoms of one or both of the benzene nuclei are replaced by the benzo nucleus

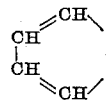

and R means hydrogen or alkyl) with a quinone-chlorimide of the formula

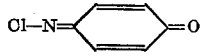

which nuclei all may contain as substituents methyl, methoxy, chlorine, hydroxy or a sulfonic acid group provided that one para-position to the N-R group is free.

2. A process which comprises condensing a benzocarbazole of the general formula

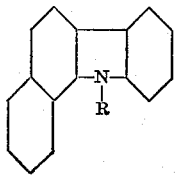

(wherein R means hydrogen or alkyl) with quinone-chlorimide.

3. As new compounds the indophenols of the benzocarbazole series corresponding to the probable general formula

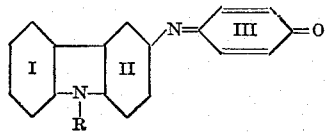

(wherein two adjacent hydrogen atoms of the nuclei I or II or I and II are replaced by the benzo nucleus

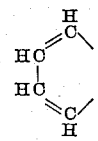

R means hydrogen or alkyl and all nuclei may contain as substituents methyl, methoxy, chlorine, hydroxy or a sulfonic acid group) which compounds represent bluish colored substances, yielding on reduction nearly colorless leuco-compounds of a definite melting point.

4. As new compounds the indophenols of the benzocarbazole series corresponding to the probable formula

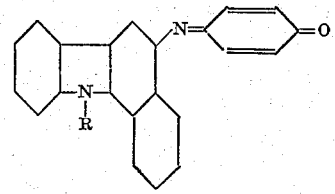

(wherein R means hydrogen or alkyl) which compounds represent bluish colored substances, yielding on reduction nearly colorless leuco-compounds of a definite melting point.

5. As a new compound the indophenol of the benzocarbazole series corresponding to the probable formula

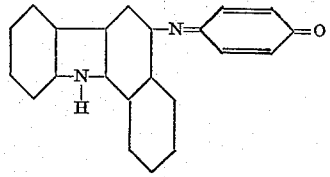

which compound represents a deep blue powder and yields on reduction a leuco-compound crystallizing from methanol in colorless leaflets, melting at 238–240°.

6. As a new compound the indophenol of the benzocarbazole series corresponding to the probable formula

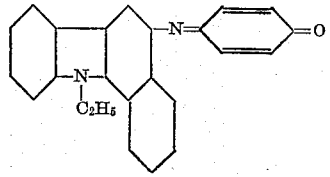

which compound represents a blue powder and yields on reduction a leuco-compound, crystallizing from carbon-disulfide in yellowish needles of 208–210° melting point.

In testimony whereof, we affix our signatures.

RICHARD HERZ.
MAX SCHUBERT.